US00RE38440E

(19) United States
(12) Reissued Patent
Dowst et al.

(10) Patent Number: US RE38,440 E
(45) Date of Reissued Patent: Feb. 24, 2004

(54) WRITING INSTRUMENT

(75) Inventors: William P. Dowst, Reading, MA (US); Edward J. Mangan, Southborough, MA (US); Roy Nicoll, Berkshire (GB)

(73) Assignee: Berol Corporation, Freeport, IL (US)

(21) Appl. No.: 10/147,595

(22) Filed: May 16, 2002

Related U.S. Patent Documents

Reissue of:
(64) Patent No.: 6,062,759
Issued: May 16, 2000
Appl. No.: 09/154,341
Filed: Sep. 16, 1998

U.S. Applications:
(63) Continuation-in-part of application No. 08/937,400, filed on Sep. 25, 1997, now Pat. No. 5,893,674.

(51) Int. Cl.[7] ..... B43K 7/00
(52) U.S. Cl. ..... 401/209; 401/6; 401/207; 401/214; 401/216
(58) Field of Search ..... 401/6, 209, 216, 401/207, 214

(56) References Cited

U.S. PATENT DOCUMENTS

| | | | |
|---|---|---|---|
| 2,487,340 | A | 8/1949 | Kleinsmith |
| 2,592,406 | A | 4/1952 | Faltin |
| 3,032,012 | A | 5/1962 | Lovejoy |
| 3,281,933 | A | 11/1966 | Fehling et al. |
| 3,352,621 | A | 11/1967 | Fehling et al. |
| 3,396,569 | A | 8/1968 | Miller |
| 3,945,735 | A | 3/1976 | Nakashiki et al. |
| 3,972,630 | A | 8/1976 | Schenk |
| 4,573,820 | A | 3/1986 | Kirchhoff |
| 4,594,015 | A | 6/1986 | Pomares |
| D299,660 | S | 1/1989 | Gordo |
| D302,442 | S | 7/1989 | Gordo |
| 5,012,663 | A | 5/1991 | Brown |
| 5,172,994 | A | 12/1992 | Brown |
| 5,527,124 | A | 6/1996 | Kolaric |
| 5,893,674 | A | 4/1999 | Dowst |
| 5,988,921 | A | 11/1999 | Medhin |
| 6,039,493 | A | 3/2000 | Seddon et al. |
| 6,062,759 | A | 5/2000 | Dowst et al. |

FOREIGN PATENT DOCUMENTS

| | | |
|---|---|---|
| BE | 495545 | 5/1950 |
| CZ | 79099 | of 1950 |
| DE | 801 614 | 1/1951 |
| DE | 871 258 | 3/1953 |
| DE | 879 811 | 6/1953 |
| DE | 902 352 | 1/1954 |
| DE | 940 630 | 3/1956 |
| DE | 1 293 650 | 4/1969 |
| DE | 2009062 | * 9/1970 |
| EP | 0 170 426 | 5/1986 |
| FR | 1.032.122 | 6/1953 |
| FR | 1.458.917 | 11/1966 |
| FR | 1.585.675 | 1/1970 |
| FR | 2151240 | 4/1973 |
| FR | 2 255 187 | 7/1975 |

(List continued on next page.)

*Primary Examiner*—Tuan N. Nguyen
(74) *Attorney, Agent, or Firm*—Marshall, Gerstein & Borun LLP

(57) ABSTRACT

A writing instrument having an elongated barrel comprised of an outer portion and an inner portion, rotatable relative one to the other. The point or writing tip is fixed to the barrel inner portion, disposed at an angle to, and may be offset from, the centerline of the barrel outer portion. The barrel inner portion is caused to rotate and move axially relative to the barrel outer portion by pressure on the writing instrument, or weights attached to the barrel inner portion, to bring the point into desired alignment during the writing process. Further pressure on the point or writing tip causes the barrel inner portion to move to a rearwardmost position at which rotation of the point or writing tip is impeded by a gripping structure.

20 Claims, 7 Drawing Sheets

FOREIGN PATENT DOCUMENTS

| | | |
|---|---|---|
| GB | 738740 | 10/1955 |
| GB | 988740 | 4/1965 |
| GB | 1 454 828 | 12/1974 |
| IT | 496361 | 7/1954 |
| JP | 5-58358 | 8/1993 |
| SU | 776-706 | 1/1979 |
| TW | 322845 | 12/1997 |
| TW | 322846 | 12/1997 |
| WO | WO 91/14521 | 10/1991 |
| WO | WO 91/16210 | 10/1991 |
| WO | WO 97/22482 | 6/1997 |
| WO | WO 98/13216 | 4/1998 |

* cited by examiner

WRITING INSTRUMENT

Matter enclosed in heavy brackets [ ] appears in the original patent but forms no part of this reissue specification; matter printed in italics indicates the additions made by reissue.

This application is a continuation-in-part of copending application Ser. No. 08/937,400 filed on Sep. 25, 1997 and which designated the U.S.

BACKGROUND OF THE INVENTION

The present invention relates to an instrument having a working point which is applied to a surface, and more particularly to a manually manipulated instrument wherein there is a preferred orientation of the working point during the instrument's use.

Various instruments having a point which is applied to a surface are available on the market. These instruments include, but are not limited to, writing systems, such as fountain pens, ballpoint pens, as well as correction fluid applicators and the like. The writing instruments, as a general rule, comprise a writing tip or point which extends from the barrel containing the ink supply, the instrument being held in the hand of the user during the writing process. In most of these writing instruments, particularly ballpoint pens, the writing tips are known to function more effectively if retained in a perpendicular position relative to the surface being written on. However, in most instances the writing instrument is not applied vertically during the writing process, but is inclined to the writing surface by the user at an angle which is generally in the vicinity of 60° to the writing surface.

In the case of a ballpoint pen, typically applied to the writing surface at about a 60° angle, the rim surrounding the ball may contact the writing surface and interfere with the smooth operation of the ball. A danger also exists that application at a 60° angle may provide wear to the ball to the extent that the ball becomes loosened.

In view of the above, it has been proposed that the point or ball-carrying portion of the ballpoint pen be oriented such that it extends at an angle to the axis of the writing instrument barrel to compensate for the tilting of the barrel during the writing process. A pen which is typical of this type of instrument is shown and described in U.S. Pat. No. 5,012,663, issued to Robert L. Brown and assigned to the assignee of the present invention.

It has, however, been found that in employing a pen of the type described above, wherein the point is disposed at an angle with the barrel longitudinal axis, orientation of the point is often difficult and may result in a poor quality of writing being produced. If the point is not oriented such that it lies at right angles to the writing surface, the user will have to reorient the writing instrument, or writing will proceed on the rim of the point.

It is, therefore, an object of the present invention to provide a writing instrument wherein the point extends at an angle to the longitudinal axis of the barrel wherein proper orientation of the point to the writing surface is ensured.

Another object of the invention is to provide a writing instrument of the type set forth above which provides proper orientation of the point to the writing surface prior to the start of the writing process.

A further of the invention is to provide a writing instrument of the type set forth above wherein the proper orientation of the point to a writing surface is retained during the writing process.

Another object of the invention is to provide a writing instrument of the above type wherein the point is rotatable relative to the barrel but remains fixed relative to the barrel during the writing process.

Yet another object of the invention is to provide a writing instrument of the type set forth above which is simple in construction and easily manufactured.

SUMMARY OF THE INVENTION

The aforementioned objects and other objectives which will become apparent as the description proceeds are accomplished by providing a manually manipulated instrument comprising an elongated tubular barrel member having a longitudinal axis. A working point for application to a surface is at the forward end of the barrel, and the point is mounted for rotation and axial movement relative to the barrel longitudinal axis. A gripping structure is disposed between the working point and the tubular barrel, along the longitudinal axis, for impeding rotation of the working point with the working point in its rearwardmost position.

In a more detailed sense, the instrument may be a writing instrument having an elongated tubular barrel member with a longitudinal axis and a writing point mounted on one end of the barrel. The point may be disposed at an angle with respect to the barrel longitudinal axis and mounted for rotation about the longitudinal axis. The writing instrument may be in the form of a ballpoint pen, in which instance the point comprises a writing ball.

The longitudinal axis is generally disposed at the centerline of the elongated tubular barrel and the instrument may further include an elongated member mounted for rotation in the elongated tubular barrel, in which case the point is fixed to the elongated member for rotation with the member.

Both the tubular barrel and the elongated member are preferably cylindrical in shape, and the elongated member may comprise an ink cartridge when the writing instrument is a pen.

In one embodiment of the writing instrument the elongated member comprises a weight portion disposed on the elongated member on the opposite side of the longitudinal axis from that of the point.

In an alternate embodiment, a writing instrument has an elongated barrel member, a writing point mounted at the forward end of the barrel, the point being disposed at an angle with respect to the barrel longitudinal axis and is mounted for free rotation about and axial movement along the barrel longitudinal axis, relative to the barrel. A gripping structure is disposed between the barrel and the writing point along the longitudinal axis for impeding rotation of the writing point when the writing point is in its rearwardmost position along the longitudinal axis.

The gripping structure generally comprises a rearwardly facing shoulder on the elongated member on which the point is fixed, and a forwardly facing surface on the elongated barrel, the surfaces being in spaced relation, one with the other, when the writing point is disposed at a forward location along the longitudinal axis, and in contact one with the other when the writing point is disposed at a rearward position along the longitudinal axis. At least one of the surfaces is of a frictional material and may be located either adjacent the forward end of the writing instrument or adjacent the rearward end of the writing instrument. The frictional material is generally disposed on the elongated barrel and may be in the form of an O-ring of resilient frictional material.

BRIEF DESCRIPTION OF THE DRAWING

Reference is made to the accompanying drawing in which there are shown illustrative embodiments of the invention from which its novel features and advantages will be apparent, wherein.

DESCRIPTION OF THE PREFERRED EMBODIMENT

Figure 2:
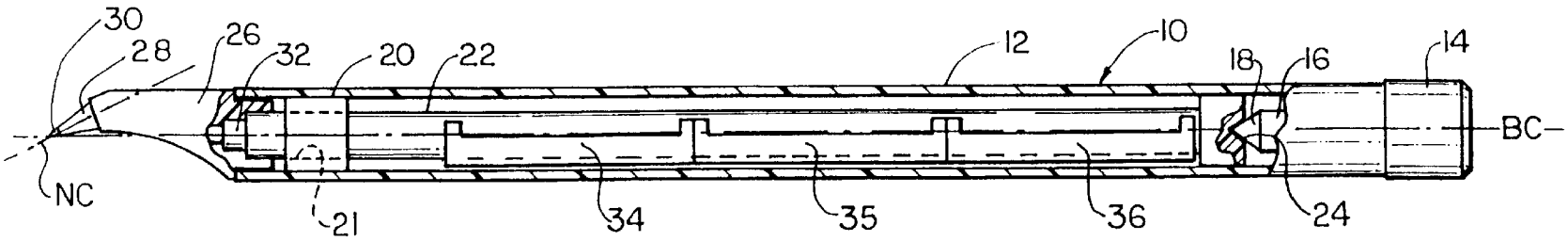
FIG. 2 is a side elevational view, similar to FIG. 1, showing an alternate embodiment of the structure of FIG. 1.
Figure 1:
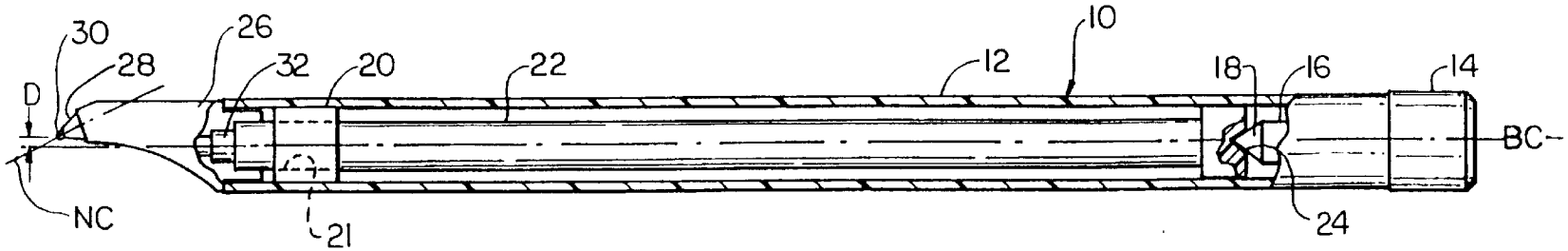
FIG. 1 is a side elevational view, partially in section, showing a ballpoint pen constructed in accordance with the teachings of the present invention.

Referring to the drawing and in particular to FIGS. 1 and 2, there is shown a writing instrument in the form of a ballpoint pen 10 comprising an outer member or barrel 12 which is cylindrical in form, having a longitudinal axis BC. The barrel 12 is open at the forward end and has a cap 14 provided at the rearwardmost end to enclose that end of the cylindrical body. A cylindrical bearing member 16 having a conical bearing surface 18 is mounted on the inner surface of the cap 14 and extends along the longitudinal axis BC on which the tip of the conical surface 18 is located. A cylindrical bearing 20 having an inner bearing surface 21 is fixed to the inner portion of the barrel 12 adjacent the forward end of the barrel.

An elongated cylindrical member 22 is mounted for rotation within the barrel 12 providing a sliding fit within the bearing surface 21 and having a conical recess 24 formed in the rearward surface thereof for mating engagement with the bearing surface 18 adjacent the rear of the barrel 12. At the forward end of the elongated cylindrical member 22 there is mounted a writing tip 26, the tip being fixed to the outer surface of the cylindrical member, but in spaced relation to the inner surface of the barrel 12 such that the tip is free to rotate with the cylindrical member 22, within the barrel 12. A writing element in the form of a cone-shaped point 28 is mounted at the forward end of the writing tip 26, the cone-shaped writing element having a centerline NC disposed at an angle to the longitudinal axis BC of the barrel 12. In the present embodiment, that of a ballpoint pen, a ball 30 which may be of any type well known in the art is provided at the forward end of the point 28, the ball being disposed on the centerline NC and spaced a distance D from the longitudinal axis BC.

An ink supply for the ball 30 is provided by an ink cartridge 32 which may be replaceable element received in the elongated cylindrical member, or in the instance of a disposable pen, may be integral with the cylindrical member 22.

Preferably, in the construction shown in FIG. 1 the distance D between the ball 30 and the longitudinal axis BC is between 0.01 inch and 0.10 inch, while the angle between the centerline NC of the point 28 is generally in the area of 30°, but may be between 20° and 40°.

Figure 3:
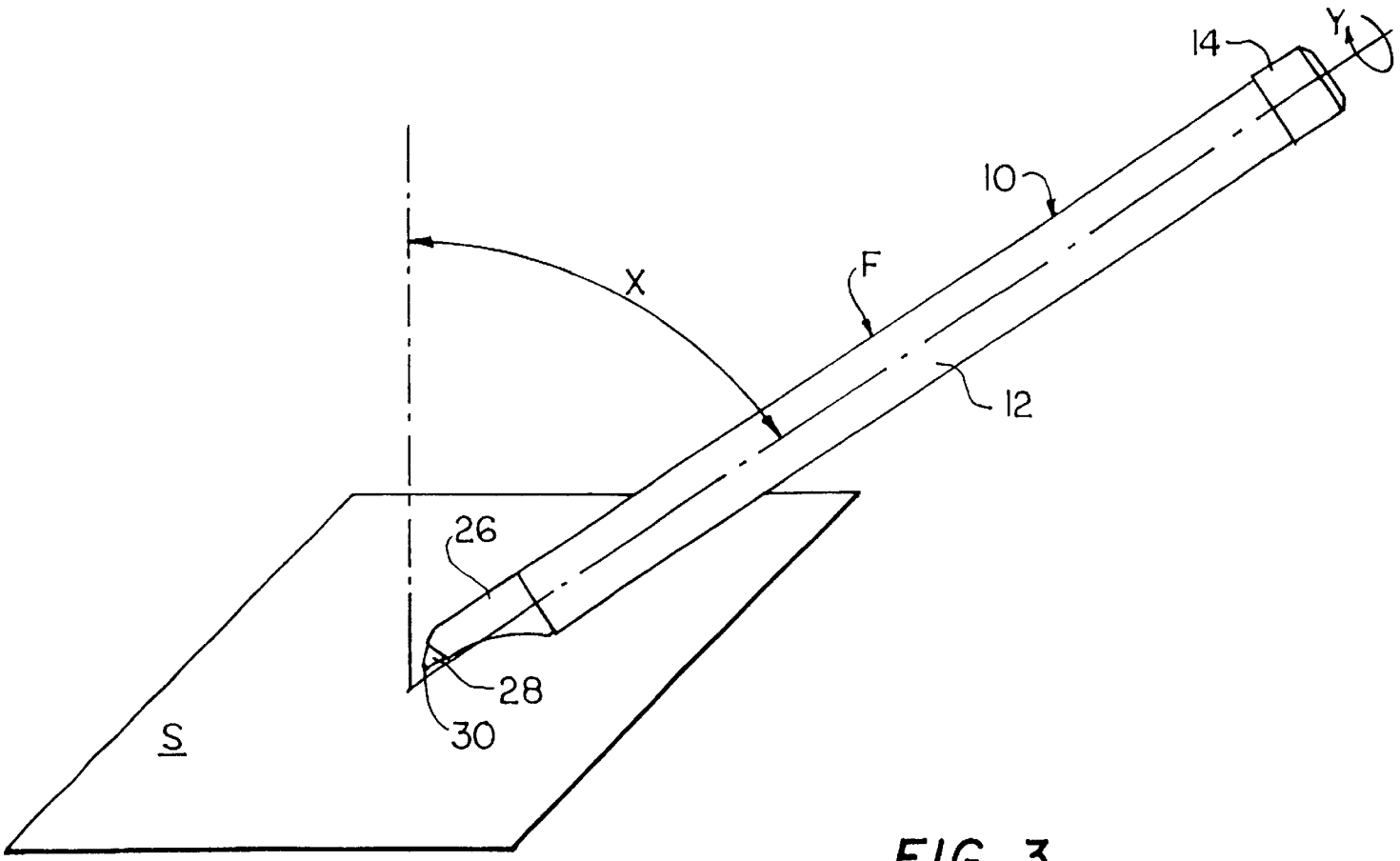
FIG. 3 is a diagrammatic view showing the ballpoint pen of FIGS. 1 or 2 during the writing process.
Figure 4:
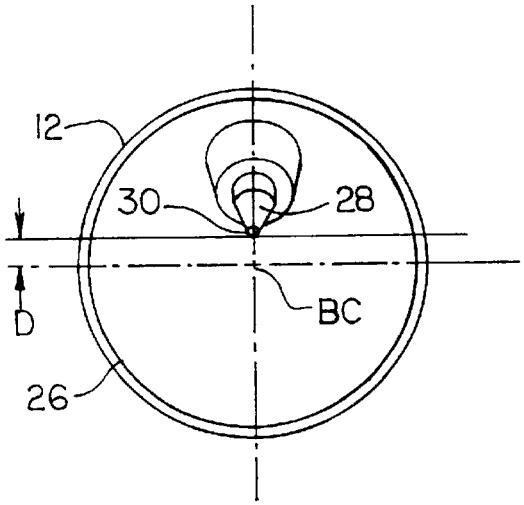
FIGS. 4 and 5 are schematic representations of the ballpoint pen of FIG. 3, as viewed from the point end of the pen.
Figure 5:
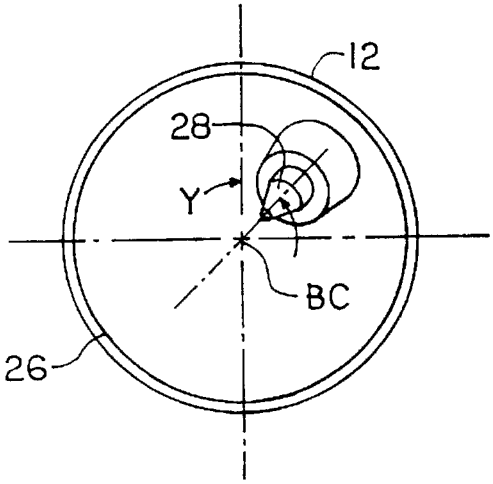

Referring now to FIGS. 3, 4 and 5, the ballpoint pen 10 of FIG. 1 is depicted in positions assumed during the writing process. As shown in FIG. 3, the ballpoint pen 10 is positioned by the user relative to a writing surface S at an angle X from the perpendicular, as the ball 30 contacts the writing surface. AT the moment of contact with the writing surface, or just prior thereto, the elongated cylindrical member 22 may be at a position wherein the point 28 is not in its neutral position (that is, the position wherein the centerline NC of the conical point is at right angles to the surface S), but is offset at an angle Y. When a perpendicular writing force F is applied to the barrel 12 of the ballpoint pen 10, a restoring torque T is applied at the point 28 counterrotating the elongated cylindrical member 22 in the direction that of the angle Y, and the centerline NC of the point 28 is directed at the proper angle to the writing surface S.

As a formula, the restoring torque T is equal to D, which is the distance of the ball 30 from the longitudinal axis BC of the barrel 12, times the perpendicular force F times the sine of angle X times the sine of angle Y; or $$T=D\cdot F\cdot \text{SINE } X\cdot \text{SINE } Y.$$

As shown in FIGS. 4 and 5, should the point 28 contact the surface S, as shown in FIG. 5, the writing process will cause the force F to be applied to the barrel 12 and the elongated cylindrical member will rotate to move the point 28 and ball 30 to the "neutral position," as shown in FIG. 4.

In FIG. 2, an alternate embodiment of the invention is shown wherein all elements as described above are indicated by like reference numerals to those of the embodiment shown in FIG. 1. However, in the embodiment of FIG. 2, a plurality of weights 34, 35 and 36 are affixed to the outer surface of the cylindrical member 22. The weights 34, 35 and 36 are disposed on the surface of the cylindrical member 22 and positioned 180° from the ball 30 about the longitudinal axis BC. In the structure of the FIG. 2, the weights 34, 35 and 36 retain the ball 30 above the longitudinal axis BC when the longitudinal axis is horizontally disposed, or at an acute angle to the writing surface.

It should be understood that with the construction shown in FIG. 2, the provision for properly locating the ball 30 on the surface S is substantially provided by employing the weights 34, 35, and 36. Therefore, with the construction shown in FIG. 2, the force F will serve to cause rotation of the point 28 and ball 30 into the proper alignment for providing the optimum in quality writing. It will be noted that with the providing of the weights 34, 35 and 36 as a rotational means, it is not necessary to produce the restoring torque provided by the distance D in the structure of FIG. 1, as explained above. The ball 30, therefore, may be located on the longitudinal centerline BC, or at another location, as desired.

While the "restoring torque" described above is a major factor in the proper orientation of the point 28 to the writing surface in the structure of FIG. 1, it should be understood that a variety of torque forces may be present on a particular writing instrument. These torques may include, but are not limited to, wobble torque (impact by change of direction during writing), dampening torque (impact by bearing friction), and, as in the structure of FIG. 2, torque imparted by weights.

Figure 6:
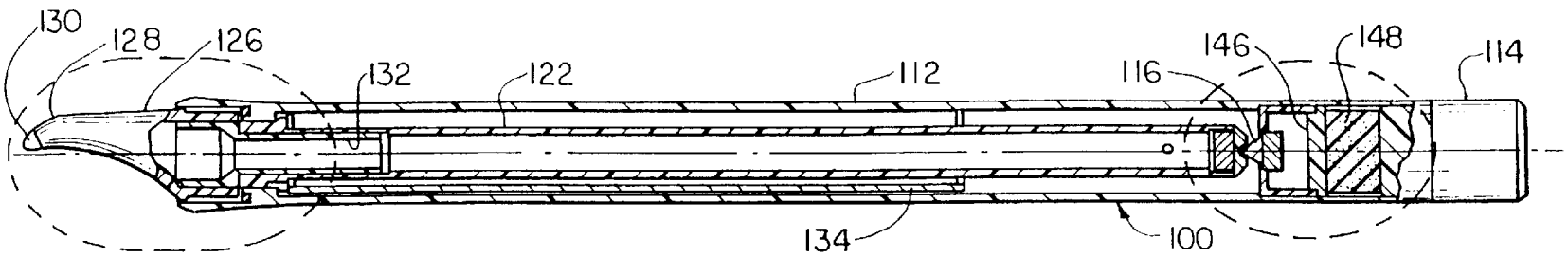
FIG. 6 is a side elevational view, partially in section, showing an alternate embodiment of the ballpoint pen of FIG. 2, providing for locking of the writing point during the writing process.
Figure 7:
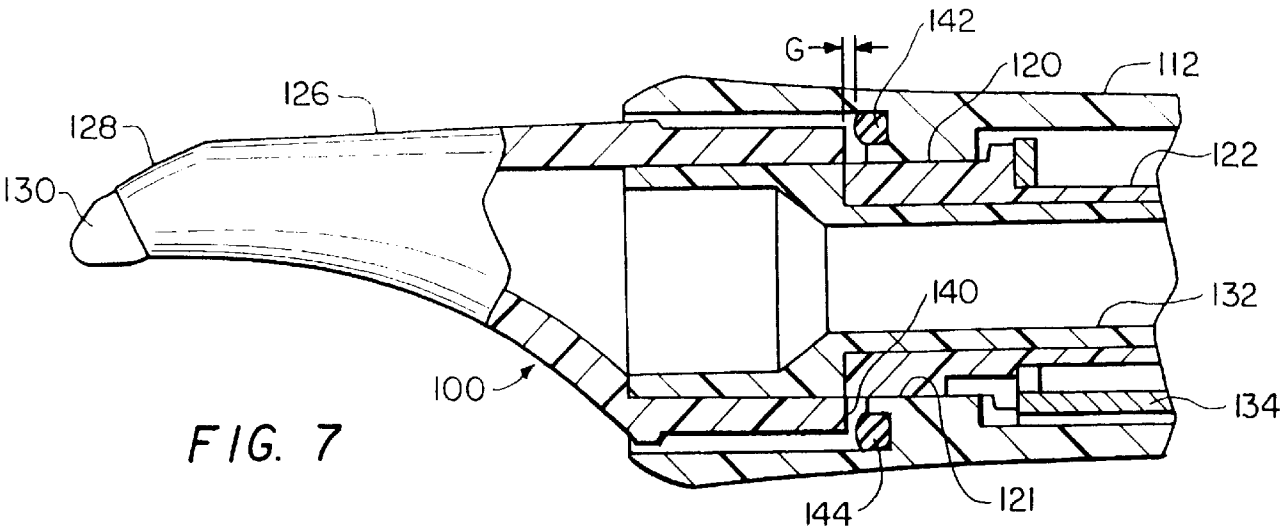
FIG. 7 is a view taken within the dash lines at the forward portion of the structure of FIG. 6, showing details of the structure of FIG. 6 shown on an enlarged scale for clarity.
Figure 8:
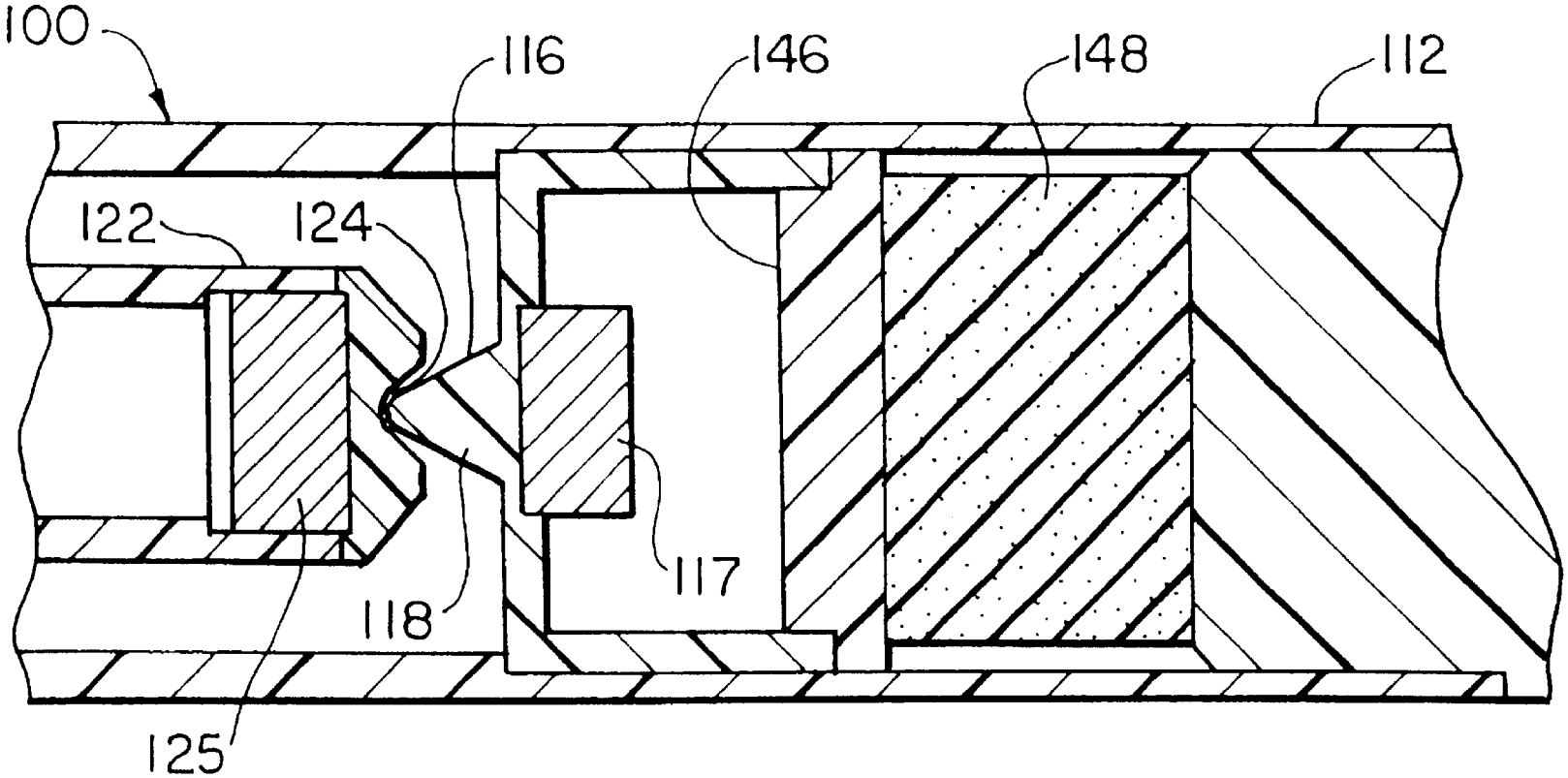
FIG. 8 is a view taken within the dash lines near the rear portion of the structure of FIG. 6 shown on an enlarged scale for clarity.

Referring now to FIGS. 6 through 8, an alternate embodiment of the invention is shown wherein a pen 100 comprises a barrel 112 having an end cap 114 and a bearing 116 having a conical bearing surface 118 disposed at the rear thereof. At the forward end of the pen 100 there is disposed a cylindrical bearing 120 having a bearing surface 121, which serve to support a cylindrical member 122 in the radial direction. The elongated cylindrical member 122 has a conical recess 124 at its rearward end, the conical recess 124 being formed in spaced relation with a magnet 125 affixed to the cylindrical member 122.

The pen 100 is similar to previous embodiments in that it comprises, at the forward end, a writing tip 126 having a coneshaped point 128 supporting a rotatable ball 130, and an ink cartridge 132.

The structure is further similar to that shown in FIG. 2 in that a weight 134 is provided at one side of the cylindrical member 122, which weight serves to function in a similar manner as previously described with regard to weights 34, 35 and 36 on the embodiment of FIG. 2.

In the present embodiment, it will be noted that a rearwardly facing surface 140 is disposed on the portion of the writing tip which is affixed to the cylindrical member 122. Also, a forwardly facing surface 142, having an O-ring 144 mounted thereon, is formed on the barrel 112 at the forward end of the pen 100, in facing relation with the shoulder 140. The O-ring 144 is of a resilient material, such as rubber, and has a friction surface for contacting the surface 140.

At the rear of the pen 100, the bearing 116 is provided with a block 117 of magnetic material, and is mounted in a cylindrical stop member 146. The stop member 146, in turn, is in contact with a pad 148 which is formed of a slow-recovery foam, generally an open-cell type, which after compression by the stop member 146 will slowly return to its at-rest state.

In the at-rest state, prior to the writing process, there is a gap G formed at the forward end of the pen barrel 112, between the surface of the rearwardly facing surface 140 and the surface of the O-ring 144, such that the O-ring 144 does not come in contact with the surface 140. The entire assembly mounted on the cylindrical member 122 is held in place, as shown in FIG. 7, by the magnetic attraction between the magnet 117 and the magnet 125, the cylindrical member 122 being allowed to rotate freely due to the gap G at the forward end of the barrel 112 with a minimum of frictional contact being maintained at the conical bearing surface 118 and conical recess 124. The gap G is generally 0.005 to 0.010 inches with the shoulder 140 in the forwardmost position.

Upon applying writing pressure to the writing tip 126 through the point 128, the entire structure connected to the cylindrical member 122 moves rearwardly with a result that the rearwardly facing surface 140 is forced toward the forwardly facing surface 142, and the gripping member in the form of the O-ring 144 prevents further rotation of the cylindrical member 122 and its attached, related structure. Simultaneously, the cylindrical stop member 146, which is slidably disposed in the barrel 112, moves rearwardly, compressing the pad 148.

When the pen 100 is removed from the writing surface, the pad 148 recovers to its at-rest shape and is effective to move the cylindrical stop member 146 forward, producing the gap G at the forward end of the barrel 112, and again allowing rotation of the cylindrical member 122 and the point 128.

The contact of the O-ring 144 with the surface 140 is thus effective to eliminate rotation of the writing tip 126 during the writing process.

Figure 9:
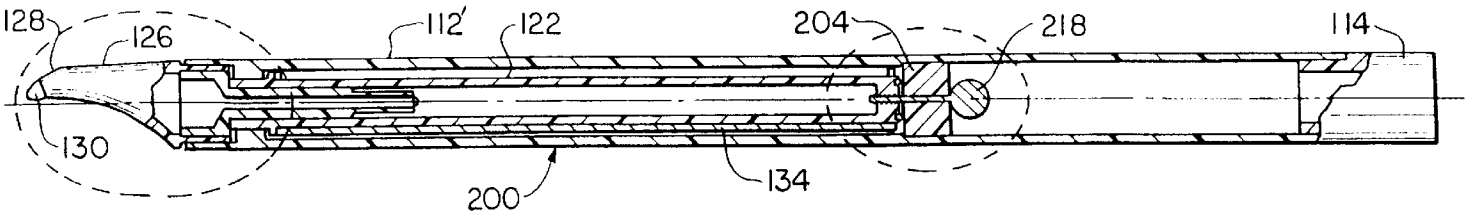
FIG. 9 is a side elevational view, partially in section, showing an alternate embodiment of the ballpoint pen of FIG. 6, showing other structure for locking the writing point during the writing process.
Figure 10:
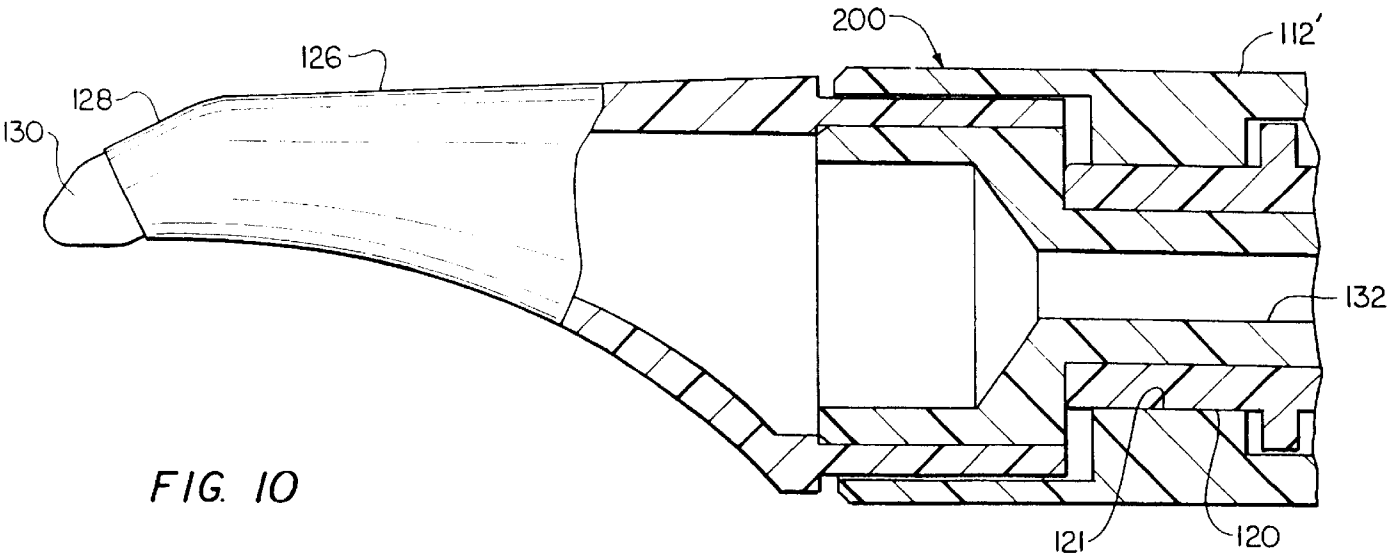
FIG. 10 is a view taken within the dash lines at the forward portion of the structure of FIG. 9, showing details of the structure of FIG. 9 shown on an enlarged scale for clarity.
Figure 11:
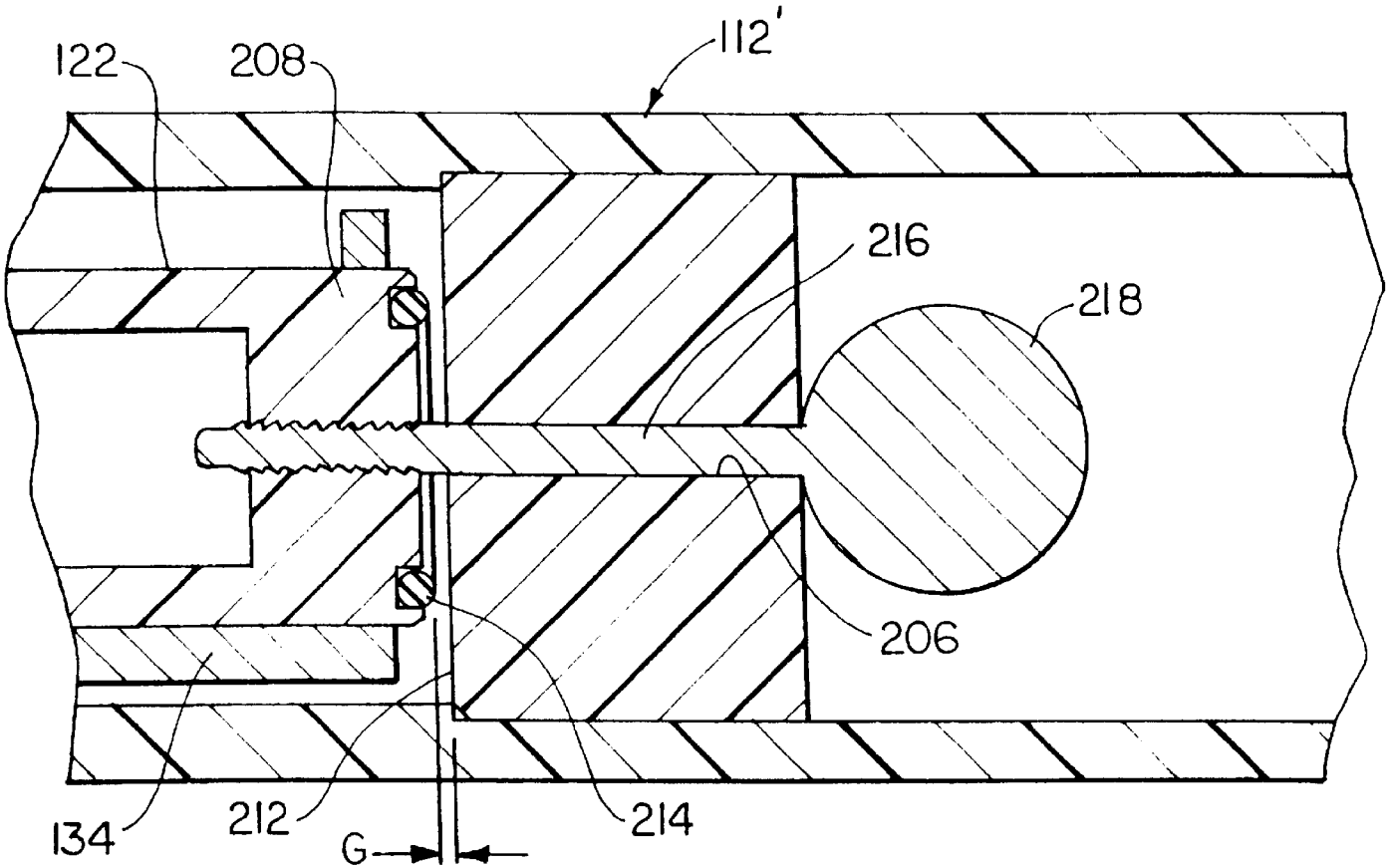
FIG. 11 is a view taken within the dash lines near the center portion of the structure of FIG. 9, further showing details of the structure of FIG. 9 shown on an enlarged scale for clarity.

Referring now to FIGS. 9, 10 and 11, a further alternate embodiment of the invention is shown in a pen 200, wherein like members have been given the same reference numerals as those found in the structure of FIG. 6.

In the structure of pen 200, as best shown in FIG. 9, the gripping structure is not located in the forward half of a barrel 112', but rather in the rearward half of the barrel. A cylindrical stop block 204 which is affixed to the inner surface of the barrel 112' has a cylindrical bore 206 running through it at the centerline of the barrel 112. A cylindrical member 122 has an end block 208 with a rearwardly facing surface 210 in facing relationship with a forwardly facing surface 212 formed on the stop block 204.

The rearwardly facing surface 210, in this embodiment, contains the frictional material in the form of an O-ring 214 for contacting the forwardly facing surface 212. As in the previous embodiment, the cylindrical member 122 is free to move forwardly and rearwardly along the centerline of the barrel 112, but is restricted from forward movement by an attach pin 216 having a round ball 218 at one end thereof. A shaft 220 extends through the cylindrical bore 206 of the stop block 204 and is threadedly attached in the end block 208 of the cylindrical member 122. The shaft 220 is designed to maintain a running fit in the cylindrical bore 206, and the ball 218 provides a minimum contact between the attach pin 216 and the stop block 204 to ensure a minimum resistance to both rotation and axial movement of the cylindrical member 122.

In operation, it has been found that the gap G between the surface of the O-ring 214 and the surface 212 will be produced by the user in prewriting orientation of the pen 200, with the writing tip 126 in a conventional downward position. The surfaces 210 and 212 generally are being maintained separated over the gap G due to gravity, to an extent providing free rotation and axial movement of the cylindrical member 122. However, when pressure is applied to the point 128, the cylindrical member 122 is caused to move rearwardly creating frictional contact between the O-ring 214 and the forwardly facing surface 212 to inhibit rotation of the cone-shaped point 128 and writing tip 126 during the writing operation.

Although O-rings 144 and 214 have been shown as elements producing a gripping structure in the described embodiments, it should be understood that frictional, mechanical, or other means may be employed for gripping purposes within the scope of the invention.

Thus, it should be understood that by employing a modified structure as that of FIG. 6, or that of FIGS. 7 through 9, a writing instrument, of the type shown and described in FIGS. 1 through 5, is provided having a further feature of a gripping structure which is effective to impede rotation of the writing point after it has been properly oriented by the user.

It should further be understood that while the instrument described herein is a pen of the ballpoint type, the present invention is equally applicable to other instruments having a working point applied to a surface, such as metal roller pens, gel ink pens, fountain pens, applicators for correction fluid, or the like.

While it is apparent that changes and modification can be made within the spirit and scope of the present invention, it is our intention, however, only to be limited by the appended claims.

As our invention we claim:

1. A writing instrument comprising:

an elongated barrel member having a longitudinal axis a forward end, and a rear end;

a writing point mounted at the forward end of said barrel;

said point being [disposed at an angle with respect to said barrel longitudinal axis and] mounted for freely rotating about said barrel longitudinal axis and axial movement relative to said barrel; and a gripping structure disposed between said barrel and said point along said longitudinal axis for impeding rotation of said writing point, with said writing point in a rearwardmost position along said longitudinal axis.

2. A writing instrument as set forth in claim 1 wherein said writing instrument is a ballpoint pen and said point comprises a writing tip.

3. A writing instrument as set forth in claim 2 wherein said writing tip is offset from said longitudinal axis.

4. A writing instrument as set forth in claim 2 wherein said longitudinal axis is disposed at the centerline of said elongated barrel member.

5. A writing instrument as set forth in claim 1 wherein said longitudinal axis is disposed at the centerline of said elongated barrel.

6. A writing instrument as set forth in claim 1 wherein said elongated barrel is tubular and further includes:

an elongated member mounted for rotation in said elongated tubular barrel;

said point being fixed to said elongated member for rotation with said elongated member.

7. A writing instrument as set forth in claim 6 wherein said gripping structure comprises:

a rearwardly facing surface on said elongated member and a forwardly facing surface on said elongated barrel, said surfaces being in spaced relation one with the other with said writing point disposed at a forward location along said longitudinal axis, and moved closer when said writing point disposed at a rearward position along said longitudinal axis.

8. A writing instrument as set forth in claim 7 wherein at least one of said surfaces is of a frictional material.

9. A writing instrument as set forth in claim 8 wherein said frictional material is disposed on said elongated barrel.

10. A writing instrument as set forth in claim 8 wherein said one surface comprises an O-ring of resilient frictional material.

11. A writing instrument as set forth in claim 7 wherein said surfaces are disposed adjacent the forward end of said writing instrument.

12. A writing instrument as set forth in claim 7 wherein said surfaces are disposed adjacent the rearward end of said writing instrument.

13. A writing instrument as set forth in claim 6 wherein said tubular barrel and said elongated member are cylindrical in shape.

14. A writing instrument as set forth in claim 6 wherein said elongated member comprises an ink cartridge.

15. A writing instrument as set forth in claim 6 which further includes means for rotating said elongated member within said tubular barrel.

16. A writing instrument as set forth in claim 5 wherein said means for rotating said elongated member within said tubular barrel comprises a weighted portion of said elongated member disposed on the opposite side of said longitudinal axis from that of said writing point.

17. A manually manipulated instrument comprising:

an elongated barrel member having a longitudinal axis a forward end, and a rear end;

a working point for application to a surface disposed at the forward end of said barrel;

said point being mounted for freely rotating about said barrel longitudinal axis and for axial movement relative to said barrel; and a gripping structure disposed along said longitudinal axis for impeding rotation of said working point with said working point disposed at a rearward position along said longitudinal axis.

18. The instrument of claim 17 wherein said working point is a writing tip.

*19. The writing instrument of claim 1, wherein the point is disposed at an angle with respect to said barrel longitudinal axis.*

*20. The instrument of claim 18, wherein the writing tip is disposed at an angle with respect to said barrel longitudinal axis.*

* * * * *